(12) United States Patent
Tarbutton et al.

(10) Patent No.: US 6,742,258 B2
(45) Date of Patent: Jun. 1, 2004

(54) METHOD OF HYDROFORMING ARTICLES AND THE ARTICLES FORMED THEREBY

(75) Inventors: Kent S. Tarbutton, Lake Elmo, MN (US); Joseph M. Lendway, IV, Dryden, MI (US)

(73) Assignees: 3M Innovative Properties Company, St. Paul, MN (US); General Motors Corporation, Detroit, MI (US)

(*) Notice: Subject to any disclaimer, the term of this patent is extended or adjusted under 35 U.S.C. 154(b) by 110 days.

(21) Appl. No.: 09/997,947

(22) Filed: Nov. 30, 2001

(65) Prior Publication Data

US 2003/0102668 A1 Jun. 5, 2003

(51) Int. Cl.⁷ .............................................. B21D 47/02
(52) U.S. Cl. ....................... 29/897; 29/897.2; 29/897.3; 29/421.1; 29/458; 29/530
(58) Field of Search ..................... 29/897.31, 897.33; 52/653.1, 653.2, 731.6, 735.1; 280/798, 796, 785; 296/29, 205, 203.01, 204, 203.04, 203.02, 203.03; 403/170–178, 403, 292, 294, 205, 231

(56) References Cited

U.S. PATENT DOCUMENTS

| | | | | |
|---|---|---|---|---|
| 5,209,541 A | * | 5/1993 | Janotik | 296/29 |
| 5,338,080 A | * | 8/1994 | Janotik et al. | 296/29 |
| 5,720,092 A | * | 2/1998 | Ni et al. | 29/421.1 |
| 5,839,777 A | * | 11/1998 | Vlahovic | 296/205 |
| 6,148,581 A | * | 11/2000 | Separautzki | 52/653.2 |
| 6,183,013 B1 | | 2/2001 | Mackenzie et al. | 280/797 |
| 6,216,509 B1 | | 4/2001 | Lotspaih et al. | 72/61 |
| 6,276,740 B1 | * | 8/2001 | Mellor et al. | 296/72 |
| 6,308,412 B1 | * | 10/2001 | Christofaro et al. | 29/897.2 |
| 6,408,515 B1 | * | 6/2002 | Durand | 29/897.2 |

FOREIGN PATENT DOCUMENTS

| | | |
|---|---|---|
| DE | 19632275 A | 8/1996 |
| EP | 0707695 | 6/1998 |
| EP | 0863358 | 9/1998 |
| WO | WO99/20516 | 4/1999 |
| WO | WO00/22024 | 4/2000 |

* cited by examiner

Primary Examiner—Charles T. Jordan
Assistant Examiner—T. Nguyen
(74) Attorney, Agent, or Firm—Harold C. Knecht, III (57) ABSTRACT

A hydroformable frame element is formed from the combination of at least two elements. The at least two elements are designed with a partially overlapping region, with an annular space defined within the overlapping region. The annular space is filled with adhesive, which is then cured to bond the at least two elements together. The adhesive bond is designed to withstand the stresses caused by the hydroforming operation and to retain its strength so that the hydroformed article is then usable as a vehicular frame element.

16 Claims, 4 Drawing Sheets

METHOD OF HYDROFORMING ARTICLES AND THE ARTICLES FORMED THEREBY

FIELD OF THE INVENTION

The present invention relates to the joining of at least two tubular members together in a manner that will allow the joined members to be hydroformed into a desired shape. More particularly, the invention relates to a method of joining male and female sections of metal tubing with an adhesive, which joined sections are then capable of withstanding the stresses of a hydroforming operation in order to form a finished product.

BACKGROUND

Historically, sheet metal sections have been used as frames for motor vehicles. A relatively recent development in motor vehicles is the use of tubular frames instead of the traditional sheet metal frames, to reduce weight and expense. Thus, it is known in the automotive industry to provide a frame for vehicles upon which various parts or body panels can be mounted. Such frames can be formed from a number of individual straight tubular (pipe) members that are connected to each other to form tubular sections. These tubular sections can form a prehydroformable birdcage then be hydroformed into the final shape.

Tubular members are advantageous because of their ready availability and good weight to strength ratio. As a result, the use of such tubular members is economically advantageous. The final shapes of these members can vary greatly from their original tubular configuration and are often, in fact, substantially rectangular. While these tubular members have been, in the past, often stamped into shape, a particularly advantageous method of forming these tubular sections into their final shape is through a hydroforming process.

Known hydroforming processes are identified in, for example, U.S. Pat. Nos. 6,216,509 B1 and 6,183,013 B1, in addition to published international application No. WO 99/20516. These patents are expressly incorporated as if set forth in their entirety herein.

WO 99/20516 discloses a hydroformed space frame and a method of manufacturing the same. Individual side rails are formed from a straight tubular blank which is bent into an S-shape and then hydroformed into the correct shape, with varying cross-sectional diameters over the length of the frame section. Individual sections are butt-welded together before the hydroforming operation to form larger sections, which are joined subsequent to the hydroforming operation.

U.S. Pat. No. 6,183,013 B1 discloses a hydroformed side rail for a vehicle frame and a method of its manufacture. According to this patent, the side rails for the vehicle frame have varying wall thicknesses and cross-sectional areas along the length of the elements. Individual portions of the rail are hydroformed and, subsequent to hydroforming, are combined into the side rail.

U.S. Pat. No. 6,216,509 B1 discloses a hydroformed tubular member and a method of hydroforming tubular members. Tubular members are formed, as taught in this patent, into end products having various circumferences, diameters and gages by varying the size of the blanks that the tube is hydroformed into.

In general, a hydroforming process forms a tubular assembly into a desired final shape by placing the tubular assembly into a die of the desired final shape and introducing a pressurized fluid into the interior of the tubular blank. The pressurized fluid shapes the tubular assembly to fit the die so as to form the final structure.

It can be readily seen from the above that it is important to the hydroforming operation that the connections between tube parts be secure and resistant to leakage, and preferably leak-tight. These connections must be able to withstand the extreme stresses applied during the hydroforming process, and yet be able to retain their structural strength in the final, formed shape. This is especially true in automotive applications, wherein the hydroformed part is typically used as a structural frame member.

Presently, the parts to be hydroformed are generally welded together, e.g. by seam welding, before being subjected to the hydroforming process. Great care must be taken to insure that the weld is of sufficient strength to withstand the hydroforming stresses.

In view of the above, it would be advantageous to develop a hydroforming process for parts to be bonded together in a reliable, economical manner, the bond being of sufficient strength to withstand the hydroforming process, substantially without leakage, and then retaining sufficient bond strength, following the hydroforming process, to be used as a structural member in, for example, an automotive application and other such applications.

SUMMARY OF THE INVENTION

The present invention provides a method for hydroforming an assembly, formed from at least two tubular members together with an adhesive. The adhesive bond between the members provides a substantially leak proof connection during the hydroforming process and maintains a sufficient bond strength to be utilized as a structural member subsequent to the hydroforming process, i.e. after the structural element has been formed into its final shape.

In another aspect of the invention, a frame structure or birdcage for a motor vehicle is provided, the frame structure comprising a plurality of individual tubes joined at a plurality of joints that include overlapping ends of individual tubes. The joints are joined by an adhesive in an annular space between the overlapping portions, then cured followed by the entire structure being hydroformed into the desired shape.

The present invention further provides a novel structural element that has been formed by applying an adhesive into a groove between at least two overlapping elements, and has then been hydroformed into its final desired shape.

Other features and advantages will be apparent from the following description of the preferred embodiments thereof, and from the claims.

DETAILED DESCRIPTION OF THE PREFERRED EMBODIMENT

Figure 1:
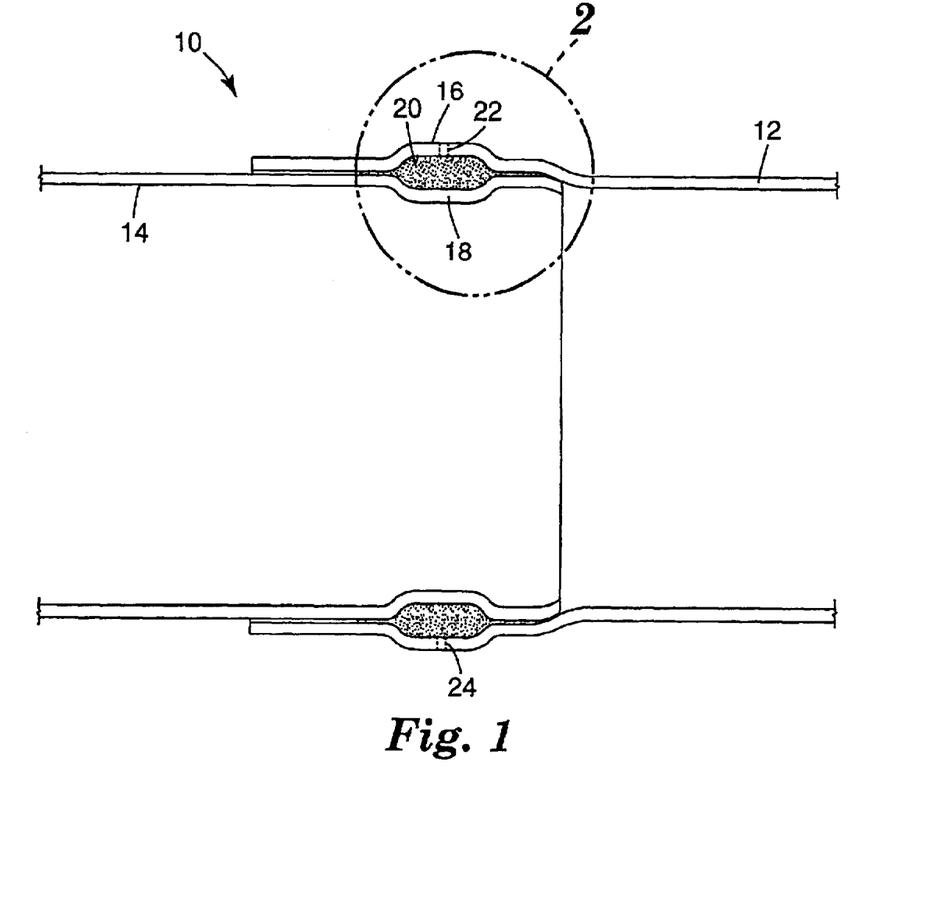
FIG. 1 illustrates a sectional view of a bonded tube assembly according to an embodiment of the present invention.

Referring now to the drawings, FIG. 1 illustrates a tubular assembly 10 according to the present invention. Tubular member 10 includes a female tube element 12 and a male tube element 14. The female tube element 12 overlaps the male tube element 14 for a portion of the length of the tube elements. The length of the overlap will typically be about 25–50 mm, although the invention clearly applies to both smaller and larger overlaps. Generally, the tubes will come with substantially even cross sections and an end portion of the female tube 12 can be expanded to the required dimensions to overlap the male tube. Connecting tube sections as described above allows for the connection of, for example, angled pieces or T-intersection pieces to the tubular elements 12, 14.

In the embodiment shown in FIG. 1, female section 12 has a recess or flare 16 and male section 14 has a recess or ditch 18 which, when the tubes are in the correct alignment, are disposed substantially adjacent to each other.

The recesses 16, 18 combine to form annular space or region 20. Annular space 20 extends about the entire periphery of the male 14 and female 12 elements, outside the male tube 14 and inside the female tube 12. Thus, the annular region 20 is a substantially ring-shaped region and is substantially enclosed by the tubes 12, 14.

In preferred embodiments of the present invention, tubes 12, 14 are preferably metal tubes, even more preferably tubes made of galvanized steel or aluminum. Other materials that are suitable for the desired end product, and which can withstand the hydroforming process, are also acceptable for use in conjunction with the present invention.

The respective grooves or recesses 16, 18 can be placed in the tubes by any process customary in the art. Typically, normal straight tube stock is used for the tubes, and the recesses are later machined into the straight tubes prior to assembly, for example by an end-forming tool.

In an especially preferred embodiment of the present invention, tube stock having an internal diameter of about 2.5 inches, with a wall thickness of about 0.050 inches can be used. Other tube thicknesses are suitable for use in the present invention depending on the desired properties of the final formed product.

Figure 2:
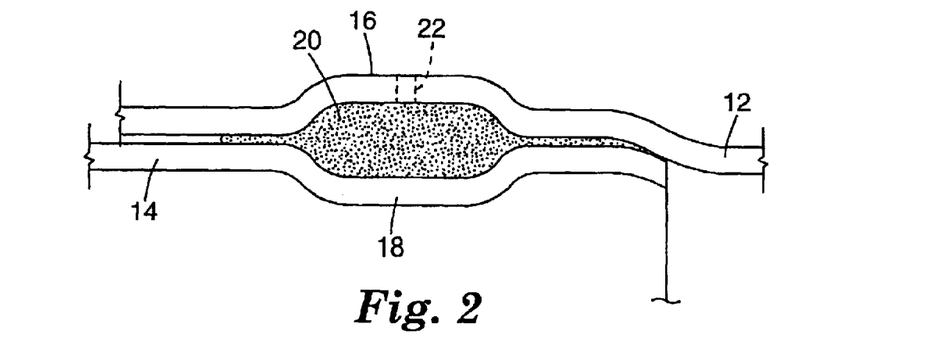
FIG. 2 illustrates an enlarged view of a portion of the assembly shown in FIG. 1.

In order to bond the tubular sections together, the present invention utilizes an adhesive placed into the annular region 20. To introduce this adhesive, an adhesive inlet hole 22 can be provided in one of the tubes to allow injection of adhesive into the annular region 20. For ease of access, it is preferred that the injection hole be placed in female element 12, as is shown in FIG. 2. The inlet hole 22 will typically be on the order of about 2.5 mm diameter, although the invention clearly applies to both smaller and larger inlet holes.

When adhesive is added to the annular region 20 through the inlet hole 22, ambient air will be displaced from the annular region 20. Thus, an exit hole 24 is preferably provided which communicates with the annular region 20. Again, it is possible for the exit hole 24 to be disposed in either the male tube 14 or the female tube 12, but it is preferable for the exit hole 24 to be disposed in the female tube 12, as shown in FIG. 1. The exit hole 24 is preferably located about 180 degrees from the inlet hole 22, and is also preferably smaller than the inlet hole 22. The exit hole may preferably be about 0.5 mm in diameter. An advantage of having the exit hole 24 positioned substantially opposite the inlet hole 22 is that it allows for a visual indication of when the adhesive has filled the annular space 20. The appearance of adhesive exiting through the exit hole is an indication that the annular space is substantially filled with adhesive.

Figure 3:
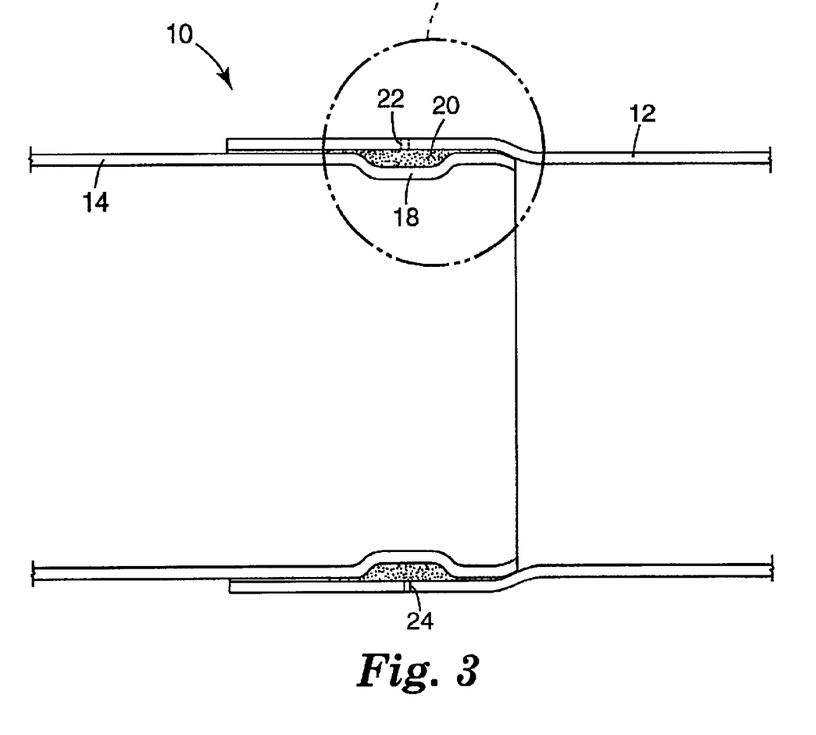
FIG. 3 illustrates a sectional view of a bonded tube assembly according to another embodiment of the present invention.
Figure 4:
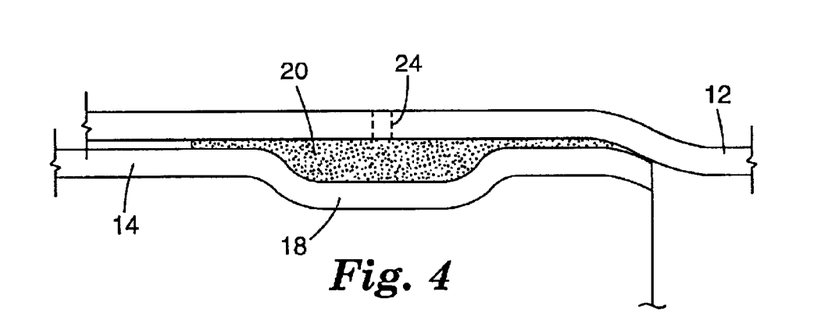
FIG. 4 illustrates an enlarged view of a portion of the assembly shown in FIG. 3.

FIGS. 3 and 4 illustrate a preferred embodiment of the present invention. In this embodiment, male tube 14 contains a recess 18, with no corresponding recess in female tube 12. Thus, the annular space 20 results from the recess 18 in the male tube 14. As with the embodiment shown in FIG. 1, this embodiment preferably includes an inlet hole 22 in the female tube and an exit hole 24, also preferably in the female tube.

When the male and female ends of the tubes are formed for overlap, the inner diameter of the female tube 12 should be slightly larger than the outer diameter of the male tube 14, so that the female tube 12 can slide over the male tube 14. While this clearance should be large enough to allow for assembly of the tube structure, it should also be minimized so that leakage can be avoided. An acceptable clearance would typically be about 0.15–0.25 mm, and is most preferably about 0.005 inches.

When forming the grooves in the male 14 and/or female tubes 12, the primary consideration for selection of the groove dimensions is the performance of the adhesive. The groove depth is merely required to be deep enough to allow flow of the adhesive. It is important to note that the stresses/strains will be concentrated at the surfaces of the tubes. Therefore, the depth of the groove will not substantially affect the ability of the tubes to withstand applied stresses and strains. Thus, this is not a major consideration in choosing the depth of the grooves. Typically, the recesses will have a depth of about 0.5–1 mm, and a width of about 5–15 mm. Additionally, there is preferably about 12–15 mm from the center of the grooves to the end of the tube section. A very important consideration for groove depth is the ratio of the groove depth to fit-up clearance. The fit-up clearance being defined as the clearance between the male and female tubes. Calculations based on slot-die flow theory in extrusion suggest that groove depth must be sufficient to prevent bypass leakage of the adhesive beyond the pipe ends. The ratio of groove depth to fit-up clearance can be a useful parameter here. It is believed that about a 0.040" groove depth—which gives a ratio of about 8—is sufficiently deep to prevent leakage.

It has surprisingly been found that by careful selection of the ratio of the above discussed clearance between the tubes and the depth of the groove, that it possible to inject the adhesive through the inlet hole 22 into the annular region 20 and have it divide about equally, flowing at approximately equal rates in both directions through the annular region 20. This is significant in that it helps to insure a uniform filling of the entire annular region 20, which helps insure sufficient yield strength and the leak resistance of the joint. The preferred ratio is dependent on the particular adhesive used, but is typically somewhere in the range of about 8. The groove depth may be important as well in this respect.

The adhesive used for the present invention provides a reliable bond between the joints which, when cured, is capable of withstanding the hydroforming stresses and substantially preventing leakage through the bonded joints.

During hydroforming, the joint, and of necessity the adhesive, are reshaped into a final form. After hydroforming, the adhesive bond still provides a reliable bond able to withstand significant stresses. This is especially important where the bonded parts form part of the structural frame of a motor vehicle. Additional heating steps may also be necessary in the formation of the vehicle, which the bonds should also be able to endure while retaining their properties. Also, due to the fact that these are to be used for structural members, the bonds should exhibit sufficient fatigue resistance and environment durability over time to form a reliable structural support.

Typically, two-part epoxy adhesives are recommended for use with the present invention because of inherent reactivity necessary for curing. This curing is from heat conducted into the adhesive by heating the metal surface in contact with the adhesive, for example by induction heating. While this invention does not require the use of epoxy adhesives, the overall physical properties of epoxy adhesives are well suited for use in the invention. Important physical characteristics to consider when choosing an adhesive for this application are the rheology and flow characteristics of the uncured adhesive relative to the temperature and the shear rate of the adhesive. It is believed that the shear yield strength of the cured adhesive should be at or above the hydroforming pressure. The reactivity of the adhesive is important for meeting cycle time requirements and allowing the adhesive to be cured to the necessary level of strength within the allowable cycle time. Finally, the bulk mechanical and bonded properties after curing are important for successful hydroformability and subsequent performance. It is preferred that the selected adhesive exhibits an elongation of at least about 10% compared to a preferred elongation of at least about 25% elongation by the metal tubing. It is believed that the adhesive should exhibit a shear yield stress which is at least equal to the expected hydroforming pressure. Therefore, with an expected minimum hydroforming pressure of about 5000 psi, a preferred adhesive would have a shear yield stress of at least about 5000 psi.

A preferred adhesive for use with the present invention is a high strength epoxy adhesive developed by the Minnesota Mining and Manufacturing Company that is the subject of U.S. patent application Ser. No. 09/170597 dated Oct. 13, 1998, and published International Patent Application No. WO/0022024 A2, which are hereby incorporated by reference as if set forth in their entirety herein. This adhesive has excellent physical properties for use in the present invention. It has been found that this adhesive resists cracking, even after curing and when subsequently hydroformed from an oval or circular cross-section to a substantially rectangular cross-section. This resistance to cracking is evident even at the stress points of the corners of the newly rectangular cross section.

When using this adhesive, it has been found that an annular region having a depth of about 0.040 inches and a width of about ⅜ inch is particularly preferable. A ratio of about 7.3 between the groove depth (about 0.040 inches in this case) and clearance (about 0.0055 inches in this case) has been found to be especially advantageous when working with this adhesive. These dimensions yield a bond that has acceptable properties, and additionally leads to the previously discussed substantially equal flow of the adhesive in both directions through the annular space 20. Again, the fit-up clearance to ditch depth ratio is important for reducing or preventing leakage. The adhesive can be mixed and inserted by, for example, a static mixing system, and the introduction of adhesive should, preferably, continue until the annular space 20 is filled. With this adhesive, a shallower groove depth of about 0.20 inches was found to result in excessive leakage beyond the pipe ends, and was therefore less desirable.

Preferred tubing for this invention would include metal tubing, preferably highly ductile, wrought metal tubing and most preferably aluminum, aluminum alloy, iron or steel wrought metal tubing. The particular tubing chosen would be largely dependent on the particular hydroforming pressure to be used. Specific preferred metallic tubing can include 1008–1010 series steel tubing having a yield strength of about 30–50 ksi (thousand pounds per square inch) with about 30% total elongation. Additionally, high yield strength (50+ ksi) steel tubing would also be appropriate for certain hydroforming pressures. Aluminum and aluminum alloys can also be suitable hydroforming materials, and preferred aluminum material tubing can include 5000 series, 6061 T6 series and 6061 T4 series aluminum tubing. While the above materials can be considered preferable, the present invention is not necessarily intended to be so limited. Other metal tubing may also be utilized in conjunction with the present invention.

The embodiment of the invention depicted in FIGS. 3 and 4 is especially preferred, (i.e. an embodiment with a groove in the male tube portion and no groove in the female tube portion,) in that it yields a sufficient structural strength while minimizing the manufacturing costs.

Figure 5:
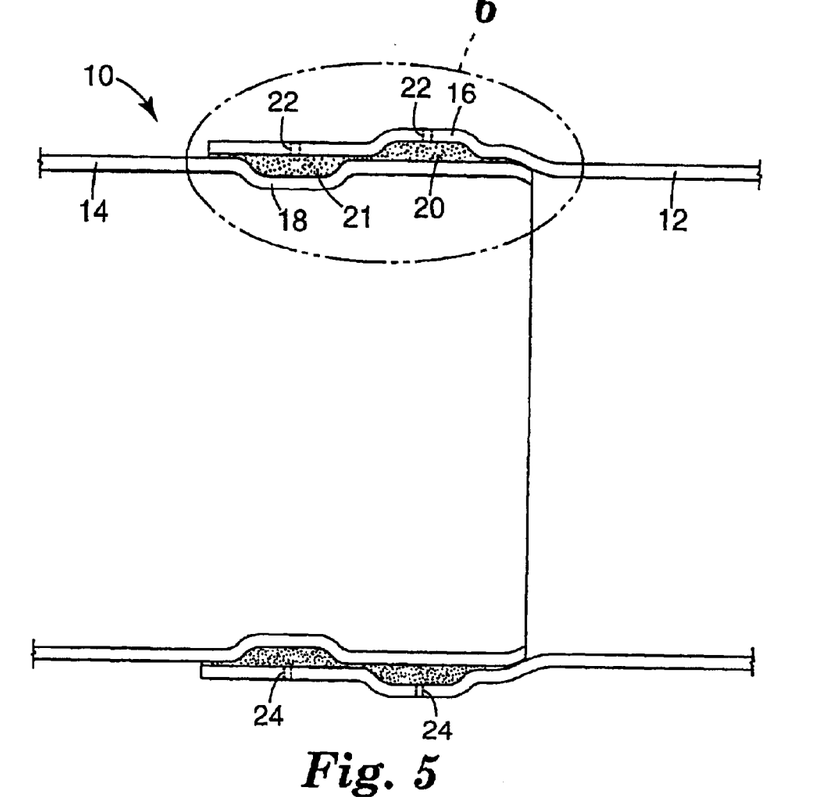
FIG. 5 illustrates a sectional view of a bonded tube assembly according to an additional embodiment of the present invention.
Figure 6:
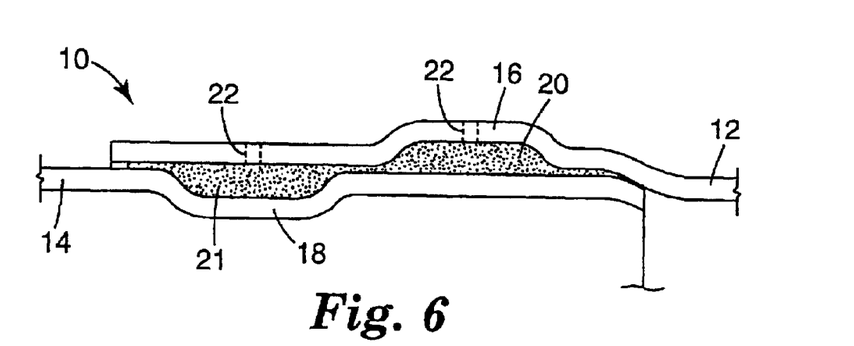
FIG. 6 illustrates an enlarged view of a portion of the assembly shown in FIG. 5.

FIGS. 5 and 6 illustrate an additional embodiment of the present invention, wherein each of the male 14 and female 12 tubes contain a recess (18, 16, respectively) but these recesses are positioned so as to be offset with respect to each other. Therefore, each recess (18, 16) forms an annular region 20, 21. In this case, each of the annular regions 20 has an individual adhesive inlet hole 22 and exit hole 24, so that each of the annular regions 20 can be filled. It should be understood that, with respect to the present invention, the male and female tubes can each contain one or more recesses to form one or more annular regions. These recesses can be aligned with recesses in the opposing tube or, alternatively, can be out of alignment with any opposing recess, therefore generating additional annular regions. Alternatively, either one of the tubes can be devoid of any recesses if the other tube contains at least one recess (as depicted in FIGS. 3 and 4).

Figure 7:
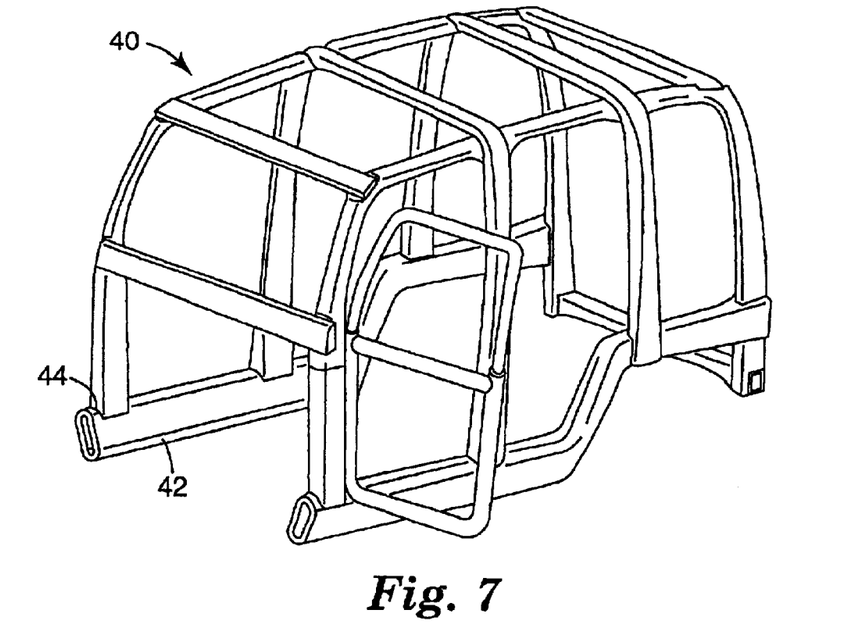
FIG. 7 illustrates a birdcage frame assembly according to the present invention.

FIG. 7 illustrates a birdcage assembly 40 for use in the construction of a motor vehicle frame. Numerous structural members 42 are joined together at joints 44 to form the birdcage 40. Each of the joints 44 is preferably joined by an adhesive as described above. The birdcage assembly can be used to form either a portion or the entirety of the frame of the motor vehicle.

As can be seen from this figure, a variety of structural configurations are possible for the hydroformed parts. A feature of the present invention is that tubing configurations other than 180 degree (straight line) configurations, are possible and, as shown in this figure, can be necessary for the desired final structure. In order to form this non-180 degree angle configuration, the female tube portion can include a remainder portion outside of the joint and the male tube portion can include a remainder portion outside of the joint. The remainder portion of the male tube portion can be disposed at an angle of greater than or less than 180 degrees to the remainder portion of said female tube portion, thus forming a non-linear segment. As can be seen from this, the remainder of the female and male tube portions can form a variety of shapes, such as an L-shape, T-shape, S-shape or a cross-shape.

Figure 8:
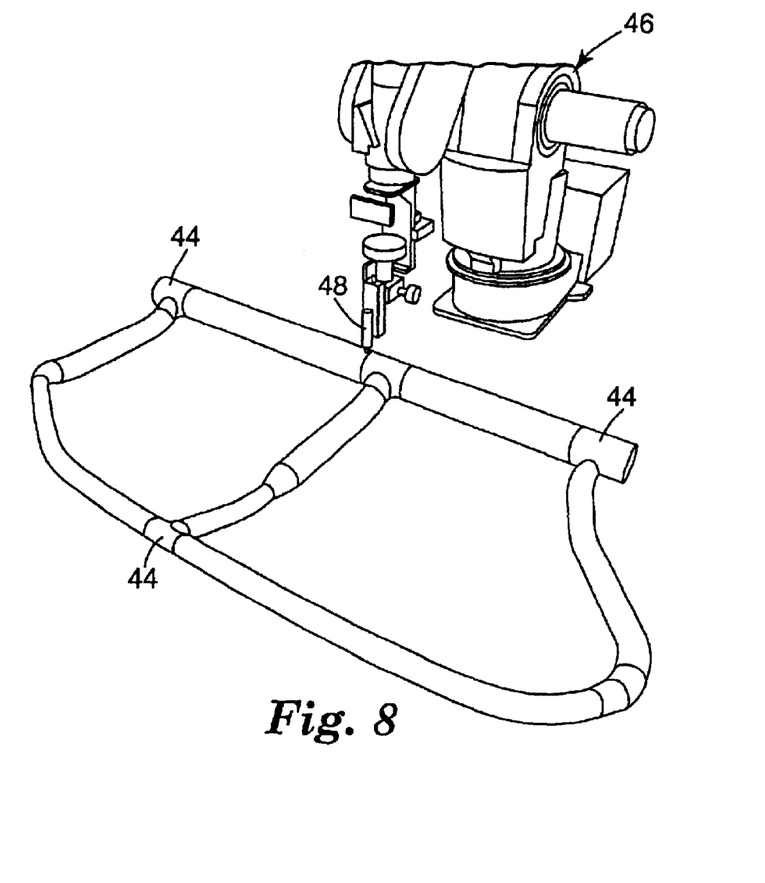
FIG. 8 illustrates schematically a machine for injecting adhesive into the joints of a hydroformable frame structure.

FIG. 8 illustrates schematically a machine 46 that injects adhesive into the joints 44 (and thus the annular regions, not shown) of the birdcage assembly 40. The adhesive is injected by a robot arm 48. The use of this machine can automate the process of injecting adhesive, thus greatly reducing the time and expense of forming the hydroformable assembly. This can greatly reduce the overall cost of manufacturing the vehicle frame.

In accordance with a method of the present invention, frame members can be formed to include a male end and a female end, having the appropriate diameters for the desired overlap. One or more grooves are formed into either or both of these members, preferably by an end-forming tool, in the areas of overlap. The tubes are preferably then treated by a degreasing solution or solvent wipe, and are then placed together in the final desired overlapping position. Adhesive inlet and air outlet holes can be formed in the tubes either before or after connection of the frame elements.

Once the frame elements are properly aligned, an adhesive is introduced to the annular region, preferably by injection through the adhesive inlet hole. Injection of adhesive is continued until the adhesive has substantially filled the entire annular region. This can be measured either by automatically measuring the rate of injection and the time of injection and comparing this to the volume of the annular region to be filled, and/or by visual inspection of the outlet hole to see when adhesive has filled the annular region.

Subsequent to the injection of the adhesive, the adhesive can then be cured. Typically, the joined structure would be held for a period at ambient conditions, for example about 24 hours, and then subjected to curing. Curing will typically occur with heating, for example in a forced air oven or by induction heating. The cured adhesive should be capable of withstanding the high pressure and resultant stresses of the hydroforming process.

Subsequent to the curing of the adhesive, the structure can be placed in a hydroforming die and pressurized to the required hydroforming pressure, which can be in excess of 7,000 psi. This hydroforming step forms the tubular pipe sections to their final desired shape, corresponding to the shape of the die, and typically having a rectangular cross section.

Known systems of forming a vehicle frame through hydroforming rely on hydroforming individual parts together which are then welded into the entire assembly. Thus, hydroforming does not occur post welding. By use of the present invention, a significant portion of the vehicle frame can be simultaneously hydroformed with many fewer post forming welds required. Preferably, the entire frame or birdcage for the motor vehicle is shaped simultaneously in a single hydroforming operation.

According to the present invention, in order to form a significant portion of a vehicle frame (for example a radiator support structure) or to form a complete frame (birdcage), the individual components can be designed with male and female ends to fit together as described above. Then, adhesive can be injected into the various resulting annular spaces and the entire assembly can be heated to cure the adhesive. Thus, through this process, the number of needed welds can be greatly reduced, lowering the manufacturing costs of the vehicle. Finally, after curing, the entire structure can be placed in a hydroforming die to be hydroformed to the final preferred geometry in a single hydroforming step. In this case, each joint must provide not only the needed structural integrity but must also withstand the hydroforming pressure. Leakage through a defect in any joint could prevent the necessary pressurization and may prevent the complete shaping of the final structure.

EXAMPLES

Example 1

A 63.5 mm OD (2.5") female pipe with a wall thickness of 1 mm was expanded to 65.5 mm with an expansion length of 30 mm from the end of the pipe. A groove was formed on the interior of the pipe 1.0 mm deep by 10 mm wide, with the centerline of the groove being spaced about 12 mm in from the open end. A corresponding male pipe had a groove of the same dimensions formed in the non-expanded insertion end. Entry and exit holes were drilled into both the male and female pipes. The male pipe was inserted into the female pipe so that the grooves were aligned. Prior to addition of the adhesive, the pipes were degreased by immersing in an Oakite 164 caustic solution at 160° F. for 10 minutes. A 10:1 mixture of a 2-part structural adhesive, SA 8051, available from Minnesota Mining and Manufacturing Corporation was mixed through an 8–24 static mix nozzle and injected through the injection holes into both cavities. The resulting assembly was held for 24 hours at ambient conditions and then placed in a forced air oven for 30 minutes at 171° C. The cured assembly was then successfully hydroformed at 5000 psi, from a basically oval shape to an essentially rectangular shape. The joint was leak free subsequent to hydroforming.

Example 2

One end of a female pipe (with dimensions about the same as those in example 1) was expanded for receiving a male pipe. Inlet and exit holes were provided in the female pipe. A 0.50 mm×10.0 mm groove was provided in a male pipe, which was inserted into the female pipe. Other dimensions of the male pipe were substantially the same as described in example 1. Cleaning, adhesive injection, curing and hydroforming were performed as described in example 1. The joint was leak resistant subsequent to hydroforming.

Example 3

Similarly to example 1, above, grooves were formed in both male and female pipes. Upon assembly, the grooves were offset by 10.0 mm. Inlet and exit holes were provided in the female pipe corresponding to each groove. Cleaning, adhesive injection, curing and hydroforming were performed as discussed in example 1. Upon hydroforming, the joint was leak resistant.

Example 4

In conjunction with embodiments of the present invention, robotically assembled frames of up to 20 joints can be injected with adhesive and then subjected to induction heating cycles, via clamshell heating coils. Thirty second heating cycles can, in this embodiment, be sufficient to fully cure the adhesive. The entire unit can then be successfully hydroformed into the desired final configuration. It can be seen from this example that the required manpower, and associated expense, for forming the frame structure can be significantly reduced through the use of the present invention.

From the above disclosure and the general principles of the present invention and the preceding detailed description, those skilled in this art will readily comprehend the various modifications to which the present invention is susceptible.

Therefore, the scope of the invention should be limited only by the following claims and equivalents thereof.

What is claimed is:

1. A method of hydroforming a tube section comprised of a male tube section having an end portion received within and overlapping an end portion of a female tube section, comprising:

curing an adhesive disposed within an annular space defined between the male and female tube sections to form a resulting tube section; and hydroforming the resulting tube section into a desired shape.

2. The method according to claim 1, further comprising providing an inlet hole in the female tube section to introduce adhesive to said the annular space.

3. The method according to claim 2, further comprising providing an exit hole in the female tube section.

4. The method according to claim 1, wherein the adhesive comprises a two-part epoxy adhesive.

5. The method according to claim 1, wherein each of the male and female tube sections comprises one of galvanized steel and aluminum.

6. The method according to claim 2, further comprising injecting adhesive into the annular space prior to the step of curing the adhesive.

7. The method according to claim 3, wherein said the exit hole is aligned about 180 degrees from the inlet hole.

8. The method according to claim 1, further comprising cleaning the overlapping area of the male and female tube sections prior to assembling the tube sections.

9. The method according to claim 1, wherein there are a plurality of annular spaces between the male and female tube sections each annular space comprising an inlet hole.

10. The method according to claim 9, wherein each annular space comprises an exit hole.

11. The method according to claim 9, comprising injecting adhesive through each inlet hole into its corresponding annular space.

12. A method of hydroforming a tube section comprised or a male tube section having an end portion received within and overlapping an end portion of a female tube section, at least one of the end portions comprised of an annular grove forming an annular space between the male and female tube sections, and an inlet hole formed in one of the end portions in communication with the annular apace for injection of an adhesive into the apace, said method comprising:

injecting an adhesive through the inlet into the annular space;

curing the adhesive to bond the male and female tube sections together; and hydroforming the tube section into a desired shape after said curing.

13. The method according to claim 12, further comprising providing an exit hole, in the same tube section as the inlet hole, about 180 degrees from the inlet hole.

14. The method according to claim 13, wherein injecting an adhesive comprises injecting adhesive into the inlet hole until the adhesive begins to exit the annular apace through the exit hole.

15. A method of forming a composite frame structure, comprising:

arranging a plurality of metal frame components into a birdcage structure so as to define a plurality of joints defined by overlapping portions of adjacent components each of the joints comprising a circumferential space formed between the overlapping portions of the adjacent components;

injecting an adhesive into each of the joints;

curing the adhesive; and hydroforming the birdcage structure into a desired shape after said caring.

16. The method according to claim 15, wherein each wherein each joint includes an annular space comprising an adhesive inlet hole and an adhesive exit hole, and said injecting an adhesive comprises injecting adhesive through each inlet hole into its corresponding annular space.

* * * * *

UNITED STATES PATENT AND TRADEMARK OFFICE
CERTIFICATE OF CORRECTION

PATENT NO. : 6,742,258 B2
DATED : June 1, 2004
INVENTOR(S) : Tarbutton, Kent S.

It is certified that error appears in the above-identified patent and that said Letters Patent is hereby corrected as shown below:

Column 9,
Line 15, after "to" delete "said".
Line 26, after "wherein" delete "said".
Line 33, after "sections" insert -- , --.
Line 40, delete "or" and insert -- of --.

Column 10,
Line 2, delete "grove" and insert therefor -- groove --.
Lines 5, 6 and 19, delete "apace" and insert therefor -- space --.
Line 33, delete "caring" and insert therefor -- curing --.
Line 35, delete "wherein each" before "joint".

Signed and Sealed this

Twenty-first Day of December, 2004

JON W. DUDAS
*Director of the United States Patent and Trademark Office*